(12) United States Patent
Piedra

(10) Patent No.: US 11,078,049 B2
(45) Date of Patent: Aug. 3, 2021

(54) ELEVATOR SYSTEM INCLUDING A PERMANENT MAGNET (PM) SYNCHRONOUS MOTOR DRIVE SYSTEM

(71) Applicant: Otis Elevator Company, Farmington, CT (US)

(72) Inventor: Edward D. Piedra, Chicopee, MA (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 706 days.

(21) Appl. No.: 15/750,964

(22) PCT Filed: Aug. 4, 2016

(86) PCT No.: PCT/US2016/045495
§ 371 (c)(1),
(2) Date: Feb. 7, 2018

(87) PCT Pub. No.: WO2017/027303
PCT Pub. Date: Feb. 16, 2017

(65) Prior Publication Data
US 2018/0222724 A1    Aug. 9, 2018

Related U.S. Application Data

(60) Provisional application No. 62/202,284, filed on Aug. 7, 2015.

(51) Int. Cl.
*B66B 11/04* (2006.01)
*B66B 1/30* (2006.01)
(Continued)

(52) U.S. Cl.
CPC ............ *B66B 11/043* (2013.01); *B66B 1/308* (2013.01); *B66B 1/32* (2013.01); *H02P 21/09* (2016.02);
(Continued)

(58) Field of Classification Search
CPC ......... B66B 11/043; B66B 1/32; B66B 1/308; B66B 2201/00; H02P 21/09; H02P 21/22; H02P 21/36
See application file for complete search history.

(56) References Cited

U.S. PATENT DOCUMENTS

| 4,484,664 A | 11/1984 | Nomura |
| 5,070,290 A | 12/1991 | Iwasa et al. |
| (Continued) | | |

FOREIGN PATENT DOCUMENTS

| CN | 1175816 A | 3/1998 |
| CN | 1221703 A | 7/1999 |
| (Continued) | | |

OTHER PUBLICATIONS

International Search Report and Written Opinion for application PCT/US2016/045384, dated Nov. 14, 2016, 14 pages.
(Continued)

*Primary Examiner* — Jeffrey Donels
(74) *Attorney, Agent, or Firm* — Cantor Colburn LLP

(57) ABSTRACT

An elevator drive system (40) includes a permanent magnet (PM) synchronous electric motor (34) including a plurality of phases and a plurality of motor drives (55, 58) electrically connected to the PM synchronous electric motor. Each of the plurality of motor drives is operatively connected to a corresponding one of the plurality of phases. The plurality of motor drives is configured and disposed to deliver a torque current divided equally between each of the plurality of phases and independently deliver flux current to the corresponding one of the plurality of phases.

22 Claims, 2 Drawing Sheets

(51) Int. Cl.
  *H02P 21/09* (2016.01)
  *H02P 21/22* (2016.01)
  *H02P 21/36* (2016.01)
  *B66B 1/32* (2006.01)

(52) U.S. Cl.
  CPC .............. *H02P 21/22* (2016.02); *H02P 21/36* (2016.02); *B66B 2201/00* (2013.01)

(56) References Cited

U.S. PATENT DOCUMENTS

| | | |
|---|---|---|
| 5,241,255 A | 8/1993 | Oshima et al. |
| 5,821,476 A | 10/1998 | Hakala et al. |
| 5,896,948 A | 4/1999 | Suur-Askola et al. |
| 6,264,005 B1 | 7/2001 | Kang et al. |
| 6,269,910 B1 | 8/2001 | Fargo et al. |
| 7,956,563 B2 | 6/2011 | Perisic et al. |
| 8,016,061 B2 | 9/2011 | Jeon et al. |
| 8,146,714 B2 | 4/2012 | Blasko |
| 8,230,978 B2 | 7/2012 | Agirman et al. |
| 8,264,190 B2 | 9/2012 | Suzuki |
| 8,314,577 B2 | 11/2012 | Takeuchi et al. |
| 8,400,092 B2 | 3/2013 | Kasunich et al. |
| 8,405,341 B2 | 3/2013 | Tagome |
| 8,493,032 B2 | 7/2013 | Krauer |
| 8,659,260 B2 | 2/2014 | Mukai et al. |
| 8,729,745 B2 | 5/2014 | Gan et al. |
| 8,742,713 B2 | 6/2014 | Ng |
| 8,841,872 B2 | 9/2014 | Pasuri et al. |
| 8,899,383 B2 | 12/2014 | De Coi et al. |
| 8,952,645 B2 | 2/2015 | Fraeger |
| 9,018,880 B2 | 4/2015 | Hayashi |
| 9,571,024 B1 * | 2/2017 | Yuan ........................ H02P 21/09 |
| 2003/0011331 A1 * | 1/2003 | Minagawa .............. H02P 21/22 318/151 |
| 2006/0137941 A1 | 6/2006 | Andrejak et al. |
| 2008/0185233 A1 | 8/2008 | Tegtmeier et al. |
| 2008/0202859 A1 | 8/2008 | Tegtmeier et al. |
| 2009/0033274 A1 | 2/2009 | Perisic et al. |
| 2011/0074333 A1 | 3/2011 | Suzuki |
| 2011/0120810 A1 | 5/2011 | Schroeder-Brumloop et al. |
| 2011/0204839 A1 | 8/2011 | Mukai et al. |
| 2012/0013284 A1 | 1/2012 | Campbell |
| 2012/0013285 A1 | 1/2012 | Kasunich et al. |
| 2012/0098355 A1 | 4/2012 | Gan et al. |
| 2013/0025974 A1 | 1/2013 | Piech et al. |
| 2014/0027209 A1 | 1/2014 | Kallioniemi et al. |
| 2014/0207335 A1 | 7/2014 | Mikamo et al. |
| 2015/0053508 A1 | 2/2015 | Kattainen et al. |
| 2015/0069949 A1 | 3/2015 | Mohammadpour et al. |
| 2015/0075915 A1 | 3/2015 | Stolt et al. |
| 2015/0122589 A1 | 5/2015 | Mezzadri et al. |
| 2016/0068368 A1 | 3/2016 | Hovi et al. |
| 2016/0315565 A1 * | 10/2016 | Vuletic ........................ H02P 6/08 |
| 2018/0244492 A1 * | 8/2018 | Piedra ........................ B66B 5/027 |
| 2019/0020227 A1 * | 1/2019 | Umemori ................ H02K 3/28 |
| 2020/0122960 A1 | 4/2020 | Valdivia Guerrero et al. |
| 2020/0122961 A1 | 4/2020 | Valdivia Guerrero et al. |

FOREIGN PATENT DOCUMENTS

| | | |
|---|---|---|
| CN | 1530315 A | 9/2004 |
| CN | 1972856 A | 5/2007 |
| CN | 101044081 A | 9/2007 |
| CN | 101741295 A | 6/2010 |
| CN | 102491137 A | 6/2012 |
| CN | 102497054 A | 6/2012 |
| CN | 202334120 U | 7/2012 |
| CN | 102712444 A | 10/2012 |
| CN | 102714483 A | 10/2012 |
| CN | 103291552 A | 9/2013 |
| CN | 203383981 U | 1/2014 |
| CN | 103560738 A | 2/2014 |
| CN | 104716786 A | 6/2015 |
| EP | 2604563 A1 | 6/2013 |
| JP | 2004238138 A | 8/2004 |
| JP | 2008156071 A | 7/2008 |
| KR | 20120041318 A | 5/2012 |
| WO | 2014108599 A1 | 7/2014 |
| WO | 2015036650 A1 | 3/2015 |
| WO | 2015105510 A1 | 7/2015 |

OTHER PUBLICATIONS

Jung, Eunsoo, et al., "A Nine-Phase Permanent-Magnet Motor Drive System for an Ultrahigh-Speed Elevator", IEEE Transactions on Industry Applications, vol. 48, No. 3, May/Jun. 2012, pp. 987-995.
Chinese First Office Action for application CN 201680046550.4, dated Jul. 2, 2019, 6 pages.
International Search Report and Written Opinion for application PCT/US2016/045495, dated Nov. 16, 2016, 13 pages.
Levi, Professor E., "Parallel-Connected Multi-Drive Systems With Reduced Number of Inverter Legs and Independent Vector Control", Liverpool John Moores University, EP/C007395/1, available at: http://gow.epsrc.ac.uk/NGBOViewGrant.aspx?GrantRef=EP/C007395/1, accessed Feb. 8, 2018, 2 pages.
Quick, Darren, "Mitsubishi develops ultra-high speed elevator technology", Feb. 3, 2012, available at: https://newatlas.com/mitsubishi-ultra-high-speed-elevator/21324/, 5 pages.
U.S. Non-Final Office Action for U.S. Appl. No. 15/750,955; dated Oct. 1, 2020; 25 Pages.

* cited by examiner

ELEVATOR SYSTEM INCLUDING A PERMANENT MAGNET (PM) SYNCHRONOUS MOTOR DRIVE SYSTEM

BACKGROUND

Exemplary embodiments pertain to the art of elevator systems and, more particularly, to an elevator system having a permanent magnet (PM) synchronous motor drive system.

Conveyance systems, such as elevator systems, use machines to impart force to a car carrying passengers. The machines employed may need to provide varying power levels depending on the application. When an elevator requires a large elevator duty or load, a drive needs be provided to power the elevator machine. Often, a high power drive may not exist, which results in high design costs and lengthy development time to manufacture a suitable drive. Even if a single, large drive exists in the marketplace, costs associated with a single, large drive may be excessive due to specialty components, component availability, etc.

BRIEF DESCRIPTION

Disclosed is an elevator drive system including a permanent magnet (PM) synchronous electric motor including a plurality of phases and a plurality of motor drives electrically connected to the PM synchronous electric motor. Each of the plurality of motor drives is operatively connected to a corresponding one of the plurality of phases. The plurality of motor drives is configured and disposed to deliver a torque current divided equally between each of the plurality of phases and independently deliver flux current to the corresponding one of the plurality of phases.

In addition to one or more of the features described above or below, or as an alternative, further embodiments could include wherein one of the plurality of motor drives is designated as a primary motor drive and remaining ones of the plurality of motor drives are designated as secondary motor drives.

In addition to one or more of the features described above or below, or as an alternative, further embodiments could include wherein the primary motor drive is configured and disposed to establish a field orientation angle for each of the secondary motor drives.

In addition to one or more of the features described above or below, or as an alternative, further embodiments could include wherein the primary motor drive is solely responsible for controlling velocity of the PM synchronous electric motor.

In addition to one or more of the features described above or below, or as an alternative, further embodiments could include wherein the PM synchronous electric motor includes at least three (3) phases.

In addition to one or more of the features described above or below, or as an alternative, further embodiments could include wherein the PM synchronous electric motor includes at least six (6) phases.

In addition to one or more of the features described above or below, or as an alternative, further embodiments could include wherein the PM synchronous electric motor includes at least nine (9) phases.

In addition to one or more of the features described above or below, or as an alternative, further embodiments could include wherein the PM synchronous electric motor includes at least twelve (12) phases.

In addition to one or more of the features described above or below, or as an alternative, further embodiments could include wherein each of the plurality of phases is independent of others of the plurality of phases.

In addition to one or more of the features described above or below, or as an alternative, further embodiments could include wherein each of the plurality of phases includes an independent ground.

Also disclosed is an elevator system including a hoistway, a car movably arranged with the hoistway, and an elevator drive system operatively connected to the car. The drive system includes a permanent magnet (PM) synchronous electric motor operatively connected to the car. The PM synchronous electric motor includes a plurality of phases. A plurality of motor drives is electrically connected to the PM synchronous electric motor. Each of the plurality of motor drives is operatively connected to a corresponding one of the plurality of phases. The plurality of motor drives is configured and disposed to deliver a torque current divided equally between each of the plurality of phases and independently deliver flux current to the corresponding one of the plurality of phases.

In addition to one or more of the features described above or below, or as an alternative, further embodiments could include wherein one of the plurality of motor drives is designated as a primary motor drive and remaining ones of the plurality of motor drives are designated as secondary motor drives.

In addition to one or more of the features described above or below, or as an alternative, further embodiments could include wherein the primary motor drive is configured and disposed to establish a field orientation angle for each of the secondary motor drives.

In addition to one or more of the features described above or below, or as an alternative, further embodiments could include wherein the primary motor drive is solely responsible for controlling velocity of the PM synchronous electric motor.

In addition to one or more of the features described above or below, or as an alternative, further embodiments could include wherein the PM synchronous electric motor includes at least three (3) phases.

In addition to one or more of the features described above or below, or as an alternative, further embodiments could include wherein the PM synchronous electric motor includes at least six (6) phases.

In addition to one or more of the features described above or below, or as an alternative, further embodiments could include wherein the PM synchronous electric motor includes at least nine (9) phases.

In addition to one or more of the features described above or below, or as an alternative, further embodiments could include wherein the PM synchronous electric motor includes at least twelve (12) phases.

In addition to one or more of the features described above or below, or as an alternative, further embodiments could include wherein each of the plurality of phases is independent of others of the plurality of phases.

In addition to one or more of the features described above or below, or as an alternative, further embodiments could include wherein each of the plurality of phases includes an independent ground.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
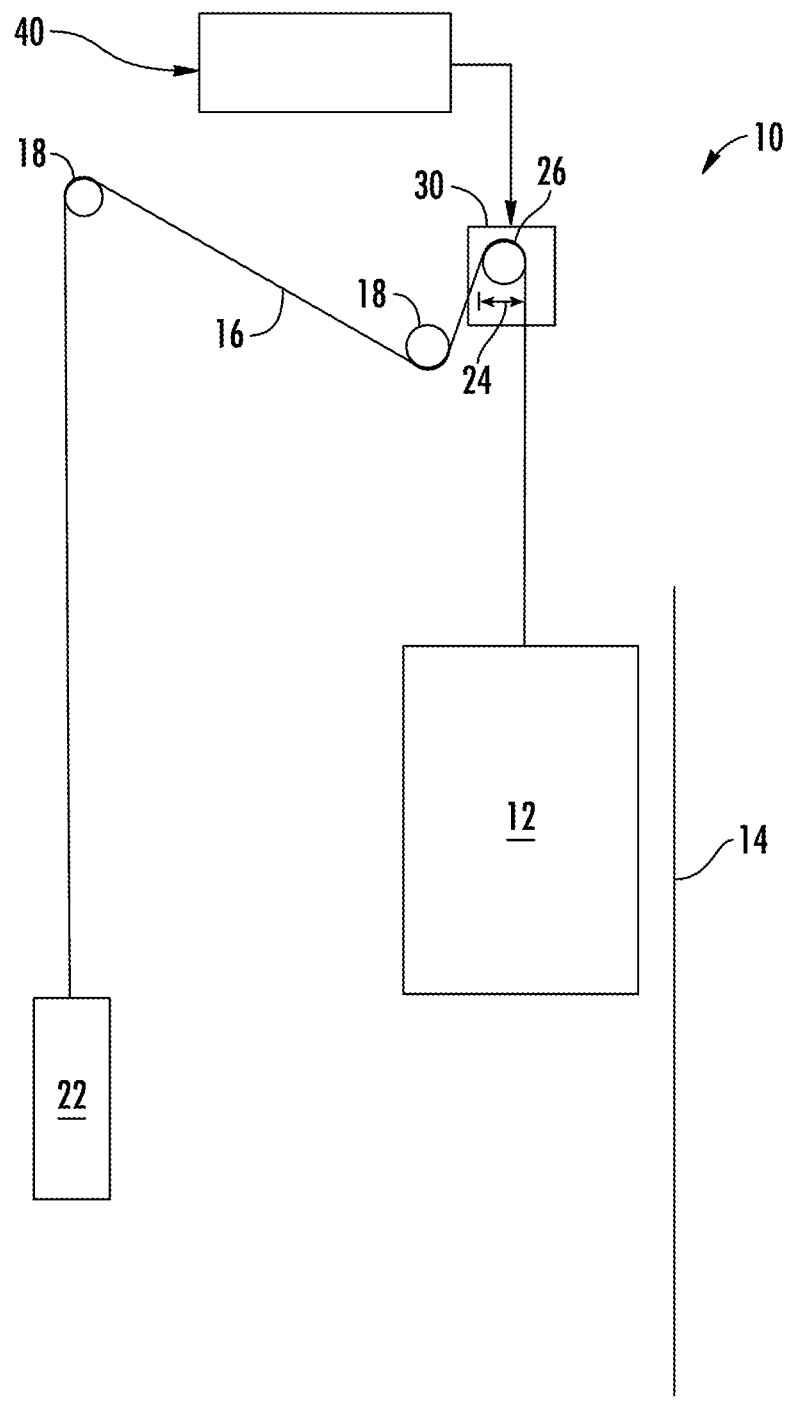
FIG. 1 illustrates an elevator system including a permanent magnet (PM) synchronous electric motor and drive system, in accordance with an exemplary embodiment.

A traction elevator system, in accordance with an exemplary embodiment, is illustrated generally at 10, in FIG. 1. Features of elevator system 10 that are not required for an understanding of the present disclosure (such as the guide rails, safeties, etc.) are not discussed herein. Elevator system 10 includes an elevator car 12 operatively suspended or supported in a hoistway 14 with a belt or rope 16. It should be understood that the number and/or arrangement of belts 16 could vary. Belt 16 interacts with one or more sheaves 18 to be routed around various components of the elevator system 10. Belts 16 could also be connected to a counterweight 22, which is used to help balance the elevator system 10 and reduce differences in belt 16 tension during operation.

Sheaves 18 each have a diameter 24, which may be the same or different than the diameters of the other sheaves 18 in the elevator system 10. At least one of sheaves 18 could be a traction sheave 26. Traction sheave 26 is driven by a machine system 30. Movement of traction sheave 26 by machine system 30 drives, moves and/or propels (through traction) belt 16. FIG. 1 depicts a 1:1 roping arrangement. However, it should be understood that elevator system 10 may include various different roping arrangements including 2:1 roping arrangements. Exemplary embodiments may also employ a cantilevered type elevator car.

Figure 2:
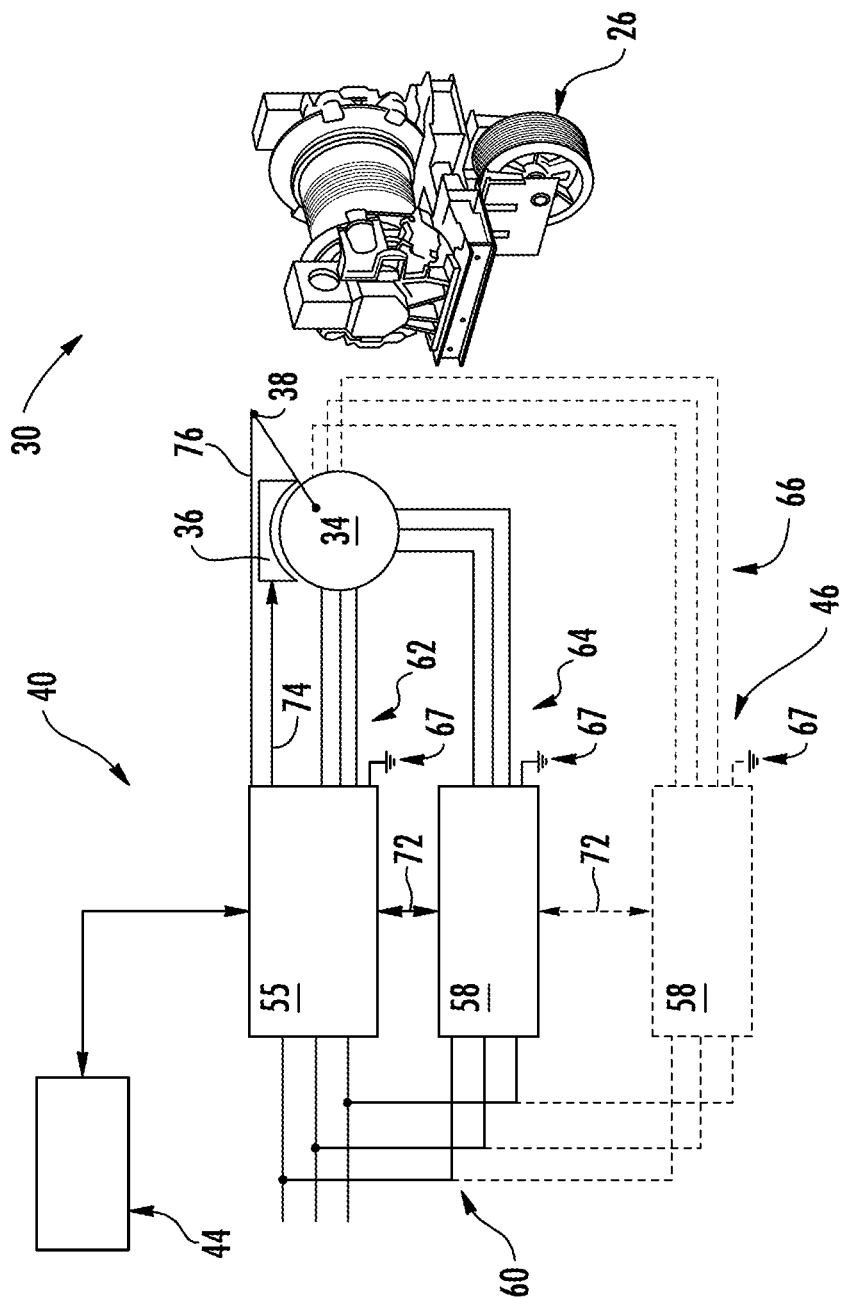
FIG. 2 is a schematic representation of the PM synchronous electric motor and drive system of FIG. 1.

In accordance with an aspect of an exemplary embodiment, machine system 30 includes a permanent magnet (PM) synchronous electric motor 34 including a brake 36 and an encoder 38, as shown in FIG. 2. PM synchronous electric motor 34 is operatively coupled to an elevator drive system 40 having a controller 44 and a plurality of motor drives 46. Motor drives 46 include a primary motor drive 55 and one or more secondary motor drives 58. Controller 44 delivers signals to primary motor drive 55 which, in turn, may deliver signals to secondary motor drives 58 as will be detailed more fully below.

In accordance with an aspect of an exemplary embodiment, elevator drive system 40 includes a three-phase or line voltage input 60. Primary motor drive 55 includes a three-phase output 62 and each secondary motor drive 58 includes a corresponding three-phase output 64 and 66. Additionally, primary motor drive 55 and each secondary motor drive 58 include a dedicated, independent, e.g., not shared, ground 67. In further accordance with an aspect of an exemplary embodiment, each three-phase output 62, 64, and 66 is independent of others of three-phase outputs 62, 64, and 66 and connects to a separate independent winding (not separately labeled) of PM synchronous electric motor 34. Further, it should be understood that the number of motor drives and corresponding independent three-phase outputs passing to PM synchronous electric motor 34 could vary. For example, PM synchronous electric motor 34 could be powered solely by primary motor drive 55 and secondary motor drive 58 representing a six-phase motor. In other embodiments, three-phase output 66 may establish a non-phase configuration, or a twelve-phase configuration.

In further accordance with an aspect of an exemplary embodiment, primary motor drive 55 is operatively connected to each secondary motor drive 58 through a corresponding first control line 72. Primary motor drive 55 is also connected to brake 36 through a second control line 74 and to an encoder 38 through a third control line 76. With this arrangement, primary motor drive 55 communicates with controller 44 and provides converter control for PM synchronous electric motor 34 as well as inverter control. Primary motor drive 55 also interacts with PM synchronous electric motor 34 to regulate current, and voltage as well as provide velocity control, brake control and a locked rotor test (LRT) for PM synchronous electric motor 34. In accordance with an aspect of an exemplary embodiment, primary motor drive 55 may be solely responsible for velocity control of PM synchronous electric motor 34. In accordance with another aspect of an exemplary embodiment, primary motor drive 55 may be solely responsible for braking PM synchronous electric motor 34 or could share braking control with one or more of secondary motor drives 58.

In yet still further accordance with an exemplary aspect, primary motor drive 55 communicates with each secondary motor drive 58 to establish/set a desired field orientation angle for each secondary motor drive 58 as well as to provide a desired torque current command. Primary motor drive 55 also communicates velocity commands; prepare to run commands; as well as any synchronization logic. In this manner, torque current (Q-Axis) to PM synchronous electric motor 34 may be divided substantially equally between each secondary motor drive 58 and flux current (D-Axis) may be independently controlled by each secondary motor drive 58.

At this point, it should be understood that exemplary embodiments describe a multi-drive control for a PM synchronous electric motor. The multi-drive control may include a number of secondary motor drives communicating with a single primary motor drive. Further, each motor drive includes an independent, multi-phase output to a separate independent winding of the PM synchronous electric motor. Further, the multi-drive system maintains no common neutrals between motor drives. The use of the motor drives in combination with the PM synchronous electric motor achieves power and control over an elevator car using a smaller motor that results in a cost savings and efficiency gain for the overall system.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An elevator drive system comprising:
    a permanent magnet (PM) synchronous electric motor including a plurality of phases; and
    a plurality of motor drives electrically connected to the PM synchronous electric motor, each of the plurality of motor drives being operatively connected to a corresponding one of the plurality of phases, the plurality of motor drives being configured and disposed to deliver a torque current divided equally between each of the plurality of phases and independently deliver flux current to the corresponding one of the plurality of phases;
    wherein one of the plurality of motor drives is designated as a primary motor drive and remaining ones of the plurality of motor drives are designated as secondary motor drives.

2. The elevator drive system according to claim 1, wherein the primary motor drive is configured and disposed to establish a field orientation angle for each of the secondary motor drives.

3. The elevator drive system according to claim 1, wherein the primary motor drive is solely responsible for controlling velocity of the PM synchronous electric motor.

4. The elevator drive system according to claim 1, wherein the primary motor drive is solely responsible for controlling braking of the PM synchronous electric motor.

5. The elevator drive system according to claim 1, wherein the primary motor drive and one or more secondary motor drives are responsible for controlling braking of the PM synchronous electric motor.

6. The elevator drive system according to claim 1, wherein the PM synchronous electric motor includes at least three (3) phases.

7. The elevator drive system according to claim 6, wherein the PM synchronous electric motor includes at least six (6) phases.

8. The elevator drive system according to claim 7, wherein the PM synchronous electric motor includes at least nine (9) phases.

9. An elevator drive system comprising:
    a permanent magnet (PM) synchronous electric motor including a plurality of phases; and
    a plurality of motor drives electrically connected to the PM synchronous electric motor, each of the plurality of motor drives being operatively connected to a corresponding one of the plurality of phases, the plurality of motor drives being configured and disposed to deliver a torque current divided equally between each of the plurality of phases and independently deliver flux current to the corresponding one of the plurality of phases;
    wherein the PM synchronous electric motor includes at least twelve (12) phases.

10. The elevator drive system according to claim 1, wherein each of the plurality of phases is independent of others of the plurality of phases.

11. The elevator drive system according to claim 10, wherein each of the plurality of phases includes an independent ground.

12. An elevator system comprising:
    a hoistway;
    a car movably arranged with the hoistway; and
    an elevator drive system operatively connected to the car, the drive system comprising:
        a permanent magnet (PM) synchronous electric motor operatively connected to the car, the PM synchronous electric motor including a plurality of phases; and
        a plurality of motor drives electrically connected to the PM synchronous electric motor, each of the plurality of motor drives being operatively connected to a corresponding one of the plurality of phases, the plurality of motor drives being configured and disposed to equally deliver torque current to each of the plurality of phases and independently deliver flux current to the corresponding one of the plurality of phases;
    wherein one of the plurality of motor drives is designated as a primary motor drive and remaining ones of the plurality of motor drives are designated as secondary motor drives.

13. The elevator system according to claim 12, wherein the primary motor drive is configured and disposed to establish a field orientation angle for each of the secondary motor drives.

14. The elevator system according to claim 12, wherein the primary motor drive is solely responsible for controlling velocity of the PM synchronous electric motor.

15. The elevator system according to claim 12, wherein the primary motor drive is solely responsible for controlling braking of the PM synchronous electric motor.

16. The elevator system according to claim 12, wherein the primary motor drive and one or more secondary motor drives are responsible for controlling braking of the PM synchronous electric motor.

17. The elevator system according to claim 12, wherein the PM synchronous electric motor includes at least three (3) phases.

18. The elevator system according to claim 17, wherein the PM synchronous electric motor includes at least six (6) phases.

19. The elevator system according to claim 18, wherein the PM synchronous electric motor includes at least nine (9) phases.

20. The elevator system according to claim 19, wherein the PM synchronous electric motor includes at least twelve (12) phases.

21. The elevator system according to claim 12, wherein each of the plurality of phases is independent of others of the plurality of phases.

22. The elevator system according to claim 21, wherein each of the plurality of phases includes an independent ground.

* * * * *